UNITED STATES PATENT OFFICE.

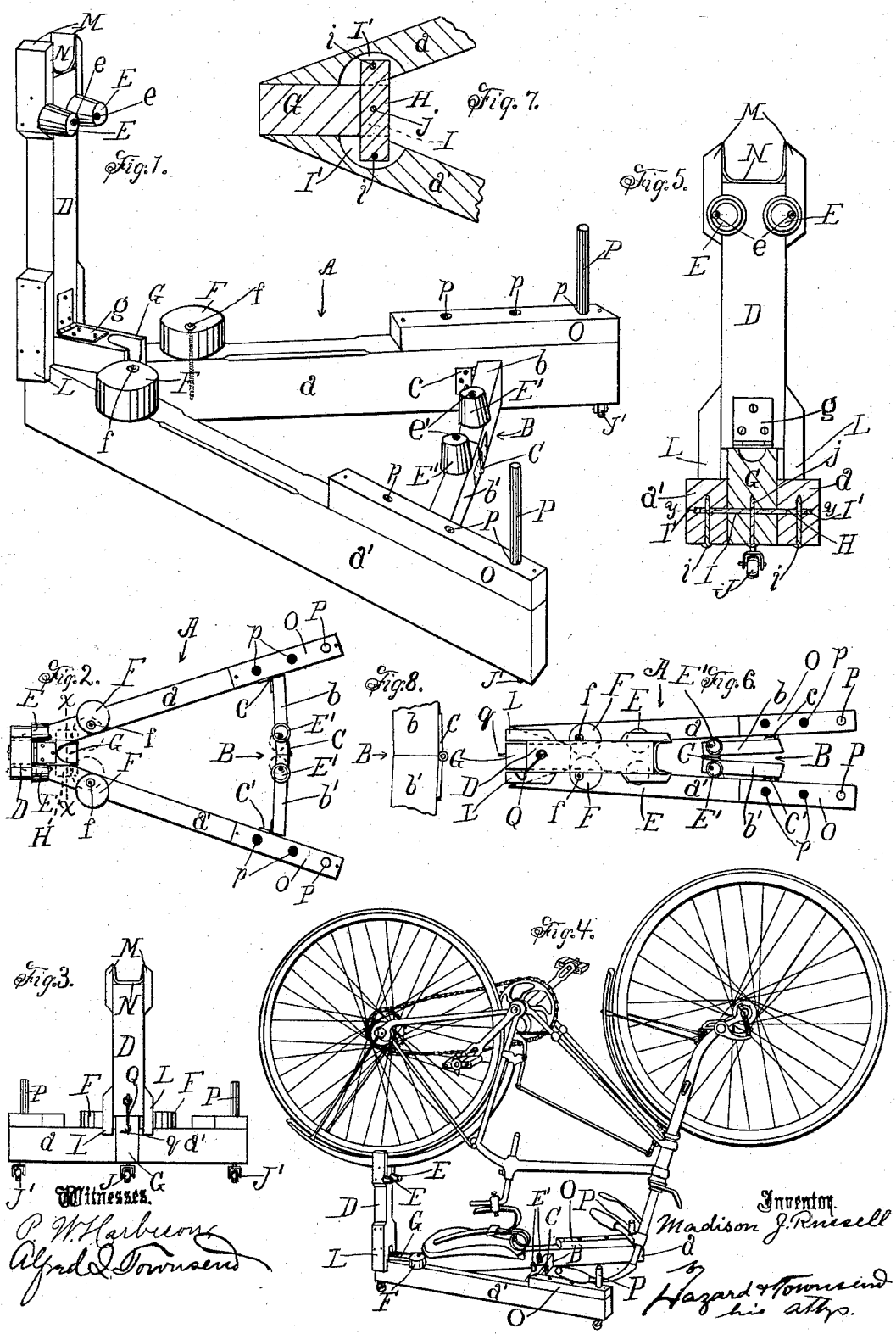

MADISON J. RUSSELL, OF LOS ANGELES, CALIFORNIA.

BICYCLE-STAND.

SPECIFICATION forming part of Letters Patent No. 477,705, dated June 28, 1892.

Application filed March 9, 1892. Serial No. 424,355. (No model.)

*To all whom it may concern:*

Be it known that I, MADISON J. RUSSELL, a citizen of the United States, residing at Los Angeles, in the county of Los Angeles and State of California, have invented a new and useful Improvement in Bicycle-Stands, of which the following is a specification.

My invention relates to stands for holding bicycles in an upright position when not in use.

The object of my invention is to provide a stand which will be simple, durable, and cheap, will be adjustable to hold bicycles of different sizes and having tires of varying thicknesses, and which will firmly hold a Safety bicycle either in an upright or in reversed inverted position, so that it will serve as a cleaning-stand, as well as perform the office of an ordinary stand.

A further object of my invention is to produce a bicycle-stand which may be folded when not in use and be stored in a small space.

The accompanying drawings illustrate my invention.

Figure 1 is a perspective view of my improved stand in position for receiving a bicycle. Fig. 2 is a plan view of the same. Fig. 3 is a front view of the same. Fig. 4 is a perspective view of the stand with a bicycle placed thereon in an inverted position ready to be cleaned. Fig. 5 is a section on line $xx$, Fig. 2, looking toward the left. Fig. 6 is a plan view of the stand as it appears when folded for storage or shipment. Fig. 7 is a section of the apex-block and a portion of the side members, showing the arrangement of the hinge and saw-kerfs. $y$ $y$, Fig. 5, show the line of section. Fig. 8 is an enlarged detail of the abutting ends of the base or cross-bar.

My invention consists in a bicycle-stand comprising the combination of a suitable supporting-frame comprising a base and an upright standard and a series of eccentrically-journaled wheel-clamping rollers arranged oppositely in pairs upon such base and standard to receive the bicycle-wheel between them.

It also consists in the combination of an A-shaped frame having its side members hinged to each other near the apex of the frame and having the cross-bar of the frame arranged near the broad end of the frame and formed of two sections hinged to the side members of the frame and to each other to fold inward toward the apex of the frame, a standard hinged at the apex of the frame and adapted to project upward therefrom, and means arranged upon such base and standard for securing a bicycle to such base.

It also consists in the combination of a block arranged at the apex of the frame and provided at its inner end with a groove or saw-kerf, a perforated plate set in such groove, the two side members respectively beveled at one end and provided at the base of the bevel with a groove or saw-kerf arranged to receive the ends of the hinge-plate and also having their beveled ends arranged to impinge the block, suitable pins arranged to pivot the plate to the side members, and a cross-bar formed in two sections hinged, respectively, to the side members and to each other to fold together and having their abutting ends beveled to allow the bar to bend slightly from the apex of the frame when the frame is extended.

It also comprises other features hereinafter set forth.

My invention, as shown, comprises the combination of an A-shaped base-frame A, having its side members $a$ $a'$ hinged to each other near the apex of the frame and having the cross-bar B arranged near the broad end of the frame and formed of two sections $b$ $b'$, hinged to the side members of the frame and to each other to fold inward toward the apex of the frame, a suitable standard D, projecting upward from the apex of the base-frame, and suitable devices or means arranged upon the base and standard to engage the wheel and handles of the bicycle and hold the bicycle in an upright position.

My invention also comprises the combination of a suitable frame and the adjustable wheel-engaging devices comprising the pairs of oppositely-arranged and eccentrically-journaled rollers E E, E' E', and F F, adapted to be rotated upon their respective axles to increase or decrease the space between the opposing faces of the rollers of each pair. The two side members $a$ $a'$ of the base are hinged to each other and to the standard-supporting apex-block G by suitable hinges. As shown, these hinges are formed by the hinge-plate H, set in the saw-kerfs l l', cut in the apex-block G and the members a a'. The hinge-plate is perforated and is secured in such block G by means of the pin or shank j of the caster J, and is secured in the side members a a' by the pins i i. The pins and caster-shank are set in the block and side members and pass through the perforations and holes provided in such block, plate, and side members for that purpose. These perforations and holes are not lettered; but the construction described will be easily understood from inspection of Figs. 5 and 7. The side members are beveled at their pivoted ends and are so arranged with relation to the apex-block that when the side members are opened to their full extent the extreme ends of the side members a a' at the apex of the frame will engage the block G beyond the pivotal point of the hinge and will prevent further outward movement of the base ends of the side members.

The sections b b' of the cross-bar B, as shown, are hinged to each other and to the side members a a' by hinges C, c, and c', respectively, so that the two members will fold inward toward the apex of the frame when the two base ends of the members a a' are brought toward each other. The sections b b' are of a combined length slightly greater than the space between the members a a' at the point where the sections b b' are hinged thereto when the base is opened to the extreme limit allowed by the hinge H and block G, and the abutting ends of the sections b b' are slightly beveled away from their connecting-hinge C, so that when the said sections b b' are drawn outward toward the base of the frame they spring the side members a a' outward, and the bevel of the abutting ends allows the center of the cross-bar to spring backward toward the base of the frame until the ends of b and b' engage each other. Then the side members a a' spring inward and hold the sections b b' in that position until the sides are again sprung out by forcing the abutting ends of the sections b b' to the rear to close the frame. The sections b b' may be arranged to fold outward against each other toward the base of the frame without departing from my invention.

The standard D is hinged to the block G by a hinge g and is provided at its lower end with the two arms L, arranged to project downward upon the outside of the ends of the sides members a a' when the frame is open, to engage and press against such ends to assist in holding the frame open, and also to steady the standard. The standard is also provided at its upper end with the two upwardly-extending arms M, having the cushion-notch N between them to receive the guard of the rear wheel of the bicycle when the bicycle is inverted on the stand, as shown in Fig. 4.

The handles of bicycles are bowed downward at the ends, and when inverted the bow is reversed. I provide the side members with handle-supporting blocks O, arranged to hold the handle high enough to prevent its middle from resting on the ground. A series of holes p p p are arranged along such blocks O to receive the pins P P, which may be set in such holes nearer to or farther from the standard D, as the case may be, to hold smaller or larger bicycles. These elevated blocks may be formed integral with the side members a a'.

Q is a hook attached to the rear face of the standard and arranged to hook into the staple q, fixed to the block G, so that when the side members are spread apart, the standard raised, and the hook secured, as shown in Fig. 3, the frame is very rigid.

The wheel-holding devices or rollers E E, E' E', and F F are circular in cross-section and preferably conical in form. They are arranged in pairs and are of sufficient height to engage the rim of the wheel when the wheel is set upon the frame between them. The rollers E E of one pair are journaled to the standard D, near the top thereof, and the rollers E' E' of the other pair are journaled upon the cross-bar B, near the middle thereof, one of the rollers being pivoted to one member b and the other roller to the member b'.

e e' indicate the pivots or journals for the rollers E and E'.

The rollers F F are mounted upon the side members a a' near their junction with the block G and are larger than the rollers E E', because of the distance apart of the members at the point where such rollers are attached thereto.

In practice when it is desired to stand the bicycle upright in the stand the wheel-engaging devices are turned, as shown in Fig. 2, and the front wheel of the bicycle is set in position on the stand with its wheel resting on the bar B between the pairs of rollers, which are then turned on their axles e, e', and f until they press against and clamp the tire of the wheel, and so support the bicycle in an upright position.

When it is desired to clean the bicycle, it is inverted, as illustrated in Fig. 4, with the handles resting against the pins P P and the rear-wheel guard of the bicycle resting in the cushioned notch N. This brings all the mechanism of the machine into convenient position for the operator and allows the wheels to rotate freely.

When not in use, the stand can be quickly folded by unhooking the hook Q from the staple q and folding the standard D downward and inward upon the block G. The sections b b' are then pushed in toward the apex of the frame and the base ends of the side members a a' are brought together, as shown in Fig. 6.

I have shown the stand mounted upon casters J J'; but the casters may be omitted if not desired.

The wheel-engaging devices are held in position by means of friction caused by securing them tightly upon their respective seats by means of the axles $e$, $e'$, and $f$. Dotted lines in Fig. 1 show the axle to be formed of a long screw, which may be tightened to give the desired amount of friction. It is to be understood the other axles $e$ and $e'$ are of like construction.

Now, having described my invention, what I claim as new, and desire to secure by Letters Patent, is—

1. A bicycle-stand comprising the combination of a suitable supporting-frame comprising a base and a standard and a series of eccentrically-journaled wheel-clamping rollers arranged oppositely in pairs upon such base and standard to receive the wheel of the bicycle between them.

2. A bicycle-stand comprising the combination of the A-shaped base-frame having its side members hinged to each other near the apex of the frame and having the cross-bar arranged near the broad end of the frame and formed of two sections hinged to the side members of the frame and to each other to fold inward toward the apex of the frame, a standard hinged at the apex of the frame and adapted to project upward therefrom, and means arranged upon such base and standard for securing a bicycle to such base and standard.

3. In a bicycle-stand, the combination set forth of the apex-block, the side members hinged thereto and provided with the pin-receiving holes, the standard hinged to the top of such block and provided with means for securing a bicycle thereto, the cross-bar arranged near the broad end of the frame and formed of two sections hinged to the side members and to each other to fold toward the apex of the frame, the pins set in the side members to receive the handle of the bicycle, and means for securing the standard in an upright position.

4. In a bicycle stand, the combination set forth of the apex-block, the side members thereto and provided with the pin-receiving holes, the standard hinged to the top of such block and provided with means for securing a bicycle thereto and provided with the projecting arms L, arranged to clasp the ends of the side members against the apex-block, the cross-bar arranged near the broad end of the frame and formed of two sections hinged to the side members and to each other to fold toward the apex of the frame, the pins set in the side members to receive the handle of the bicycle, and means for securing the standard in an upright position.

5. In a bicycle-stand, the combination of the apex-block provided in its end with the saw-kerf I, and the side members beveled at one end and provided at the base of the bevel with the saw-kerfs I', the perforated hinge-plate set in such saw-kerfs, and the pins set in such block and side members and passed through the perforations in the plate.

6. In a bicycle-stand, the A-shaped base-frame comprising the combination of the apex-block, the side members respectively beveled at one end and hinged to such apex-block near the base of such bevel and provided with the cross-bar formed of two members hinged, respectively, to the two side members and to each other and arranged to fold against each other, the standard hinged to the apex-block and projecting upward therefrom and provided with the downwardly-projecting arms arranged to engage the ends of the side members of the A-shaped frame, and the wheel-engaging devices arranged upon such frame and standard to receive and support the bicycle.

7. In a bicycle-stand, the A-shaped base-frame comprising the combination of the side members hinged to each other near the apex of the frame, the cross-bar formed of two sections hinged, respectively, to the side members of the frame and to each other and having their abutting ends slightly beveled away from their connecting-hinge and of a combined length slightly greater than the space between such side members at the point where the sections of the cross-bar are attached thereto, a standard arranged to project upward at the apex of the frame, and suitable devices arranged upon the base and standard to receive and support a bicycle.

MADISON J. RUSSELL.

Witnesses:
JAMES R. TOWNSEND,
F. M. TOWNSEND.